(12) United States Patent
Nyman et al.

(10) Patent No.: US 11,184,181 B2
(45) Date of Patent: Nov. 23, 2021

(54) SYSTEM FOR ASSIGNING ACCESS RIGHTS TO USER DEVICE AND METHOD THEREOF

(71) Applicant: ControlThings Oy Ab, Porvoo (FI)

(72) Inventors: Jan Nyman, Porvoo (FI); Kristian Bäckström, Porvoo (FI); Jesper Lökfors, Pernå (FI)

(73) Assignee: ControlThings Oy Ab, Porvoo (FI)

( * ) Notice: Subject to any disclaimer, the term of this patent is extended or adjusted under 35 U.S.C. 154(b) by 267 days.

(21) Appl. No.: 16/280,176

(22) Filed: Feb. 20, 2019

(65) Prior Publication Data

US 2020/0267006 A1 Aug. 20, 2020

(51) Int. Cl.
*H04L 9/32* (2006.01)
*H04L 29/06* (2006.01)

(52) U.S. Cl.
CPC .......... *H04L 9/3271* (2013.01); *H04L 9/3247* (2013.01); *H04L 63/06* (2013.01); *H04L 63/102* (2013.01)

(58) Field of Classification Search
CPC ....... H04L 9/3271; H04L 9/3247; H04L 9/30; H04L 63/06; H04L 63/102; H04L 63/105; H04L 2209/805
See application file for complete search history.

(56) References Cited

U.S. PATENT DOCUMENTS

| | | | |
|---|---|---|---|
| 2014/0173686 A1 | 6/2014 | Kgil et al. | |
| 2015/0365473 A1 | 12/2015 | Zuerner | |
| 2016/0087933 A1 | 3/2016 | Johnson et al. | |
| 2016/0323283 A1* | 11/2016 | Kang | H04W 12/0609 |
| 2017/0005820 A1 | 1/2017 | Zimmerman et al. | |
| 2017/0026185 A1* | 1/2017 | Moses | H04L 9/006 |
| 2017/0155647 A1* | 6/2017 | Hennebert | H04L 63/102 |

(Continued)

FOREIGN PATENT DOCUMENTS

WO 2017162064 A1 9/2017

OTHER PUBLICATIONS

Lee BM, Patil M, Hunt P, Khan I. An Easy Network Onboarding Scheme for Internet of Things Networks. IEEE Access. Dec. 28, 2018;7:8763-72. (Year: 2018).*

(Continued)

*Primary Examiner* — Robert B Leung
(74) *Attorney, Agent, or Firm* — Ziegler IP Law Group, LLC

(57) ABSTRACT

A system for assigning access rights to a user device. The system includes a source configured to serve the executable code to the user device and a target device. The target device is configured to perform at least one of creating a target device crypto-identity, which is an asymmetric cryptographic keypair consisting of a public key and a corresponding private key; and assigning itself a target device crypto-identity. Upon receiving a connection from the user device having an executable code for connecting and authenticating with a cryptographic algorithm, the target device is configured to receive a user device contact information in an executing environment of the target device and determine whether admin rights have been set in the target device. The system also includes the user device configured to use a resource identifier for obtaining the executable code from the source and executing the executable code in the user device.

20 Claims, 4 Drawing Sheets

(56) References Cited

U.S. PATENT DOCUMENTS

2017/0359338 A1* 12/2017 Tschofenig ............. G06F 21/34
2018/0047232 A1*  2/2018 Sakumoto .......... G07C 9/00309
2019/0058586 A1*  2/2019 Kumar ................. H04L 9/0866
2019/0296973 A1*  9/2019 Jeuk ........................ H04L 67/12

OTHER PUBLICATIONS

"How to connect xender with PC wireless" https://www.youtube.com/watch?v=I8TFilzPbKI, Published Nov. 13, 2017, 1 page.
Novelty Search Report, dated Oct. 10, 2018, 46 pages.

* cited by examiner

SYSTEM FOR ASSIGNING ACCESS RIGHTS TO USER DEVICE AND METHOD THEREOF

TECHNICAL FIELD

The present disclosure relates generally to Internet of Things (IoT) technology; and more specifically, to systems and methods for assigning access rights to a user device for public key relations primarily to enable efficient communication between the user device and Internet of Things (IoT) devices.

BACKGROUND

Internet of Things (IoT) has been developed to enable user control over various electronic devices. Typically, a user device, such as smartphone or a tablet computer and the like are operated by a user to communicate and control the Internet of Things (IoT) devices. Conventionally, the user devices hosts and executes a software application for communicating and controlling a given Internet of Things (IoT) device. Generally, a default or a desirable username and password is used for accessing the software application.

However, there are several problems associated with the conventional techniques. Firstly, individual manufacturer promotes usage of a specific software application (developed by the manufacturer) for communicating and controlling the Internet of Things (IoT) device produced by the manufacturer. For example, a user may discover in a library environment a printer which the user needs to use for printing a document. In such event, as per the conventional techniques, the printer may require authentication using an obtained pin code or smart card in order to serve the user, or printing may be limited to a specific predefined computer. Such techniques are generally cumbersome and unfavorable for the user device and for the printer facilitators.

In such event, as per the conventional techniques the user has to acquire and install the dedicated software driver produced by the manufacturer of the printer for accessing the printer. Such techniques are generally cumbersome for the user and unfavorable for the user device. Thus, accessing plurality of Internet of Things (IoT) devices produced by different manufacturers would require hosting and using plurality of software application in the user device. Moreover, accessing each of the plurality of software application requires the use of unique username and password. Thus, for accessing plurality of software application, the user has to remember plurality of unique username and password. Moreover, the user has to accurately input a username and password in a given software that corresponds to a given Internet of Things (IoT) device. General recommendations are telling users to 1) not re-use the same password on several devices, 2) use complex passwords containing special characters and numbers, 3) change each password on regular basis, 4) avoid storing the passwords in written notes, 5) make sure to enter the secret password only when authenticating with the target device, not to any phishing attempt. As the human intervention is error prone, such operating architecture is cumbersome for the user. Additionally, accessing such software applications over an unsecure network or remote device can lead to malpractices such as phishing and the like. Secondly, the software applications are often provided via cloud services. In such architectures, the user data, such as personal data is often subject to unauthorised access.

Therefore, in light of the foregoing discussion, there exists a need to overcome the aforementioned drawbacks associated with accessing and managing Internet of Things (IoT) devices.

SUMMARY

The present disclosure seeks to provide a system for assigning access rights to a user device. The present disclosure also seeks to provide a method for assigning access rights to a user device. An aim of the present disclosure is to provide a solution that overcomes at least partially the problems encountered in prior art, and provides efficient, user-friendly and secure communication with the Internet of Things (IoT) devices.

In an aspect, an embodiment of the present disclosure provides a system for assigning access rights to a user device, the system comprising:
  a source configured to serve the executable code to the user device;
  a target device, wherein the target device is configured to perform at least one of:
    creating a target device crypto-identity, which is an asymmetric cryptographic keypair consisting of a public key and a corresponding private key; and
    assigning itself a target device crypto-identity;
and upon receiving a connection from the user device having an executable code for connecting and authenticating with a cryptographic algorithm, the target device is configured to:
  receive a user device contact information in an executing environment of the target device;
  determine whether admin rights have been set in the target device
    if not, then setting in the target device the user device public key to have admin rights;
    if yes, then either
      decline access for the user device,
      request access from an admin, or
      assign a role defining level of access for the user device contact information on the target device according to target device application and trustworthiness of the user device,
and
  the user device, the user device being configured to use a resource identifier for
    obtaining the executable code from the source;
    executing the executable code in the user device for performing at least one of:
      creating a user device crypto-identity; and
      assigning a user device crypto-identity;
      connecting the user device with the target device using a target device contact information; and
      transmitting the user device contact information to be received by the target device; wherein the user device contact information comprises the user device public key.

In another aspect, an embodiment of the present disclosure provides a method for assigning access rights to a user device, the method is implemented using a system comprising:
  a source configured to serve the executable code to the user device;
  a target device, wherein the target device is configured to perform at least one of:
    creating a target device crypto-identity, which is an asymmetric cryptographic keypair consisting of a public key and a corresponding private key; and assigning itself the target device crypto-identity;
and upon receiving a connection from the user device having an executable code for connecting and authenticating with a cryptographic algorithm, the target device is configured to:
  receiving a user device contact information in an executing environment of the target device;
  determining whether admin rights have been set in the target device
    if not, then setting in the target device the user device public key to have admin rights;
    if yes, then either
      decline access for the user device,
      request access from an admin, or
      assign a role defining level of access for the user device contact information on the target device according to target device application and trustworthiness of the user device,
and
the user device, the user device being configured to use a resource identifier for
  obtaining the executable code from the source;
  executing the executable code in the user device for performing at least one of:
    creating a user device crypto-identity; and
    assigning a user device crypto-identity;
  connecting the user device with the target device using a target device contact information; and
  transmitting the user device contact information to be received by the target device; wherein the user device contact information comprises the user device public key.

Embodiments of the present disclosure substantially eliminate or at least partially address the aforementioned problems in the prior art, and enables efficient and secure communication by connecting and authenticating the user device, the source and the target device with a cryptographic algorithm.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
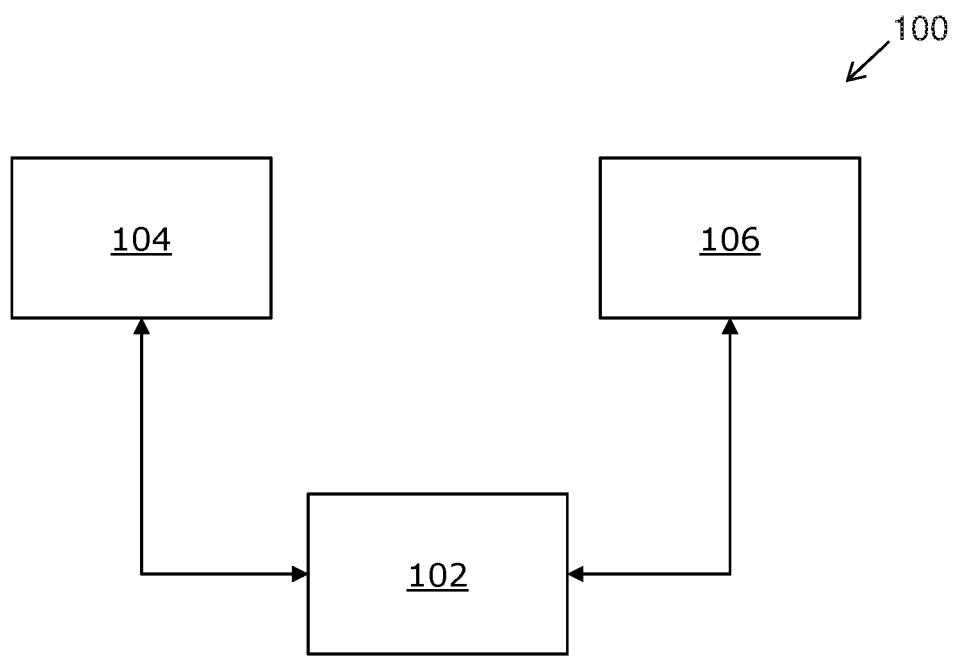
FIG. 1 is a block diagram of a system for assigning access rights to a user device for public key relations, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect, an embodiment of the present disclosure provides a system for assigning access rights to a user device, the system comprising:
a source configured to serve the executable code to the user device;
a target device, wherein the target device is configured to perform at least one of:
  creating a target device crypto-identity, which is an asymmetric cryptographic keypair consisting of a public key and a corresponding private key; and
  assigning itself a target device crypto-identity;
and upon receiving a connection from the user device having an executable code for connecting and authenticating with a cryptographic algorithm, the target device is configured to:
  receive a user device contact information in an executing environment of the target device;
  determine whether admin rights have been set in the target device
    if not, then setting in the target device the user device public key to have admin rights;
    if yes, then either
      decline access for the user device,
      request access from an admin, or
      assign a role defining level of access for the user device contact information on the target device according to target device application and trustworthiness of the user device,
and
the user device, the user device being configured to use a resource identifier for
  obtaining the executable code from the source;
  executing the executable code in the user device for performing at least one of:
    creating a user device crypto-identity; and
    assigning a user device crypto-identity;
  connecting the user device with the target device using a target device contact information; and transmitting the user device contact information to be received by the target device; wherein the user device contact information comprises the user device public key.

In another aspect, an embodiment of the present disclosure provides a method for assigning access rights to a user device, the method is implemented using a system comprising:

a source configured to serve the executable code to the user device;

a target device, wherein the target device is configured to perform at least one of:

creating a target device crypto-identity, which is an asymmetric cryptographic keypair consisting of a public key and a corresponding private key; and assigning itself the target device crypto-identity;

and upon receiving a connection from the user device having an executable code for connecting and authenticating with a cryptographic algorithm, the target device is configured to:

receiving a user device contact information in an executing environment of the target device;

determining whether admin rights have been set in the target device if not, then setting in the target device the user device public key to have admin rights;

if yes, then either decline access for the user device, request access from an admin, or assign a role defining level of access for the user device contact information on the target device according to target device application and trustworthiness of the user device, and the user device, the user device being configured to use a resource identifier for obtaining the executable code from the source;

executing the executable code in the user device for performing at least one of:

creating a user device crypto-identity; and assigning a user device crypto-identity;

connecting the user device with the target device using a target device contact information; and transmitting the user device contact information to be received by the target device; wherein the user device contact information comprises the user device public key.

The present disclosure provides the aforementioned method, and the aforementioned system for assigning access rights to a user device for public key relations, wherein the user device does not need any preparation—such as preloaded executable code. The user device is assigned access rights for a target device when the user device executes an executable code, and the user device is authenticated by a public key relation using a cryptographic algorithm. Thus, the system is software independent and therefore such a system can be implemented in computing devices having low-performance processors and/or storage media. Furthermore, the use of identity relation enables a user to use any computing device as the user device for receiving assigned access rights for the target device. Additionally, the public key relation enables the user device to authenticate and access the target device without the use of the conventional password-based authentication, which requires secrets to be transmitted. Thereby, the system is immune to malpractices such as phishing. Furthermore, the system requires nominal or no human intervention, and can be implemented very easily.

The system is configured to assign access rights to the user device. The system is a collection of one or more programmable and/or non-programmable components, such as processors, memories, connectors, cables and the like. Furthermore, the programmable components are configured to store and execute one or more computer instructions. Moreover, execution of the one or more computer instructions enables the system to assign access rights to the user device. Throughout the present disclosure the access rights of user device refer to enabling the user device to control the functionality of any communicably coupled device, namely the target device (explained herein later). For example, controlling the functionality may include controlling viewing access, creation access, editing access, and any combination thereof. In an example, the access rights of an electronic door lock may include controlling the movement of the parts of locking and unlocking the electronic door lock. In another example, the access rights of an autonomous vehicle may include controlling the ignition of the autonomous vehicle, accelerator of the autonomous vehicle, brakes of the autonomous vehicle and the like. In another example, the access rights of smart lighting system may include controlling the features of other communicating device (similar to the user device) with the smart lighting system.

The user device is any computing device associated with (or used by) a user that is capable of enabling the user to perform specific tasks associated with the aforementioned system. Examples of specific tasks to be performed by the user device may be controlling the locking and unlocking of communicably coupled device, such as a smart door. Furthermore, the user device is intended to be broadly interpreted to comprise any electronic device that is used for voice and/or data communication over a communication network. Examples of user device comprise, but are not limited to, cellular phones, personal digital assistants (PDAs), handheld devices, laptop computers, personal computers, smart watches and the like. Additionally, the user device comprises a memory unit, a processor, a network interface card, a display and the like. Therefore, the access rights assigned to the user device are permissions or rights that enable the user device to control functions of the communicably coupled device. In an example, the access rights may enable the user device to govern the working of the one or more hardware components in the communicably coupled device. Additionally, assigning the access rights to the user device comprises providing complete or partial permissions or rights to control the functionally of the communicably coupled device.

The system comprises the source configured to serve the executable code to the user device. The source refers to a structure and/or module that is configured to store, process and/or share information, namely the executable code. Optionally, the source comprises any arrangement of physical or virtual computational entities that can be both single hardware server and/or plurality of hardware servers operating in a parallel or distributed architecture. Optionally, the source is configured to execute one or more software application for storing and/or sharing the executable code.

The executable code refers to any collection or set of instructions that are executable by a digital system, namely the user device. Additionally, the executable code is stored in a storage medium of the user device. Examples of such storage medium may comprise RAM, ROM, a hard disk, optical disk, or so forth. Furthermore, the executable code is organized as libraries, object classes, Internet-based programs stored on a remote server, source code, interpretive code, object code, directly executable code, and so forth. It will be appreciated that the executable code can invoke certain system-level code or calls to other software residing on a user device or other location communicatively coupled with the user device to perform certain functions.

Optionally, the source is a database which is an organized body of executable code regardless of the manner in which the executable code or the organized body thereof is represented. For example, the organized body of executable code may be in the form of a table, a map, a grid, a packet, a datagram, a file, a document, a list or in any other form. The executable code is served to the user device upon receiving a request from the user device. In operation, the user device connects with the source via the data network, and subsequently requests for the executable code, and thereafter the source provides the executable code to the user device.

The system comprises the target device. Throughout the present disclosure, the term "target device" relates to any device, comprising one or more programmable and non-programmable components that are capable of performing any task, or a virtual device running on a virtualisation layer which can migrate between various physical environments. For example, the target device may be a surveillance camera intended to continuously or discontinuously capture images or videos of an environment. Optionally, the target device is an Internet of Things (IoT) device which is configured to communicate with the user device via a data network, such as, IPv4, IPv6, 5G, Bluetooth, Universal Mobile Telecommunications System (UMTS), LoRa, SigFox or similar Low-Power Wide-Area Network (LPWAN), Internet and the like. It will be appreciated that the user device communicates with the target device for controlling the functionality of the target device. Optionally, the target device is an assembly comprising any object and an Internet of Things (IoT) module. In such an instance, the Internet of Things (IoT) module is configured to control one or more operation of the object and communicate with the user device. In an example, an assembly may comprise an electronic door lock and the Internet of Things (IoT) module. In such an example, the Internet of Things (IoT) module may control the locking and the unlocking of the electronic door lock, and communicate with the user device. Optionally, an Internet of Things (IoT) module is embedded in the target device.

The target device is configured to creating a target device crypto-identity, which is an asymmetric cryptographic keypair consisting of a public key and a corresponding private key. The creating of the crypto-identity includes execute one or more computer program or routine stored in the one or more programmable component, such as a random-access memory or a processing chip of the target device. Moreover, the one or more computer program or routine is loaded in the one or more programmable component during the manufacturing of the target device. In operation, the target device crypto-identity is readily generated when the target device is used for the first time, such as receiving a power supply for initializing the functioning of the target device for the first time or latest when commissioning is made.

Furthermore, the initializing the functioning of the target device comprises generating a pair of asymmetric cryptographic keys comprising the private key and the public key. The pair of public and private keys is typically of a unique combination of bits. Optionally, the one or more computer program or routine includes a random number generator that is used together with a keypair generating algorithm for generating the asymmetric cryptographic keypair consisting the public key and the private key. The public key and the private key are sets of data that is used to encrypt and decrypt information, or produce a signature of the data, and validate the signature. In an example, the public key is an integer number, which is 256 bits long when expressed in the binary number system. In an example, the private key is an integer number, which is 512 bits long when expressed in the binary number system. The key generation module generates the pair of cryptographic keys using a seed number. Generally, the seed number is a random number which is processed by the key generation module to produce the pair of cryptographic keys. The random number generator randomly generates the seed number for the key generation algorithm to ensure that generation of the pair of cryptographic keys is secure.

The target device is configured to assigning itself the target device crypto-identity. Specifically, assigning the target device crypto-identity refers to using the cryptographic features to identify itself. The crypto-identity's cryptographic features such as sign in conjunction with verify or encrypt in conjunction with decrypt can be used for verifying the possession of the private key which corresponds to the readable public key of the target device. In an example, a programmable component configured to store the target crypto-identity may be cache memory that may be readily accessed by other programmable components, namely the processing chip comprised in the target device.

Furthermore, the target device is configured for receiving a connection from the user device having an executable code for connecting and authenticating with a cryptographic algorithm. Specifically, the target device receives the connection from the user device upon the execution of the executable code at the user device. It will be appreciated that, the executable code executed by the user device is served by the source to the user device via the data network. The connection from the user device for connecting to the target device is a connection request that is generated by the user device and communicated via the data network, upon the execution of the executable code at the user device.

Optionally, a target discovery information to the user device is provided by at least one of keyboard, network interface, radio receiver, camera, the target device, an online discovery service, a local subnet discovery protocol, a received file, a Bluetooth device, an electronic wallet, the source, a barcode, a QR code, a visual recognition and an NFC tag. Specifically, the target discovery information refers to one of an URI to the source, and a data structure. The target discovery information allows the user device to obtain the executable code from source, for identifying and communicating with the target device. In an example, the target discovery information may comprise the communication protocols for communicating with the source.

In an example, the source is the target device.

In another example, the target discovery information does not comprise contact information to the target device, but comprises an URI to the target device which is also the source. In this example, the source provides the target contact information to the user device.

In yet another example, the target discovery information comprises both the target contact information and an URI to a cloud service which provides the executable code. In this example, the source provides a generic executable.

In a further example, the target discovery information comprises both an identifier for obtaining the target contact information and an URI to a cloud service which provides the executable code. In this example, the source provides a generic executable.

In a still further example, the target discovery information to the target is an IP address typed in on the user device, where the target device is also the source. In this example, the executable is configured with a target contact information which points back to the source.

In an example, the target device may include a keyboard, wherein the user may use one or more keys in the keyboard to input the target discovery information to the user device from the target device. In another example, the target device may include a network interface that is configured to broadcast the target discovery information to be received at the user device from the target device. In another example, the user device may include a radio receiver that is configured to receive the target discovery information to the user device. In another example, the target device may include a camera that is configured to recognise the user device and thereafter transmit the target discovery information to the user device. In another example, the target device may be referenced by on an online discovery service, wherein the service is configured to enable the user device to receive the target device discovery information via the Internet. In such example, the user device may transmit the connection request and retrieve the target discovery information via the Internet. In another example, the target device may include a local subnet discovery protocol, wherein the protocol the target device discovery information is broadcasted on the subnet and received by the user device. In another example, the target device may include a received file, wherein the received file may be electronically transferable file that is provided to the user device. In such example, the received file may be electronic mail attachment file that includes the target discovery information. In another example, a Bluetooth® beacon device of a building may be configured to broadcast or share the target device discovery information. In such example, the user device is provided with the target discovery information when the user device is with the Bluetooth® connectivity range of the sending beacon device. In another example, the target device may include an electronic wallet, wherein the electronic wallet is configured to share the target discovery information to the user device upon receiving payment from the user device. In another example, the target device may include the source, wherein the source is configured to share the target discovery information to the user device via the data network. In another example, the target device may include a barcode a QR code or the like, wherein the user device may scan the barcode to retrieve the target discovery information from the target device. In another example, a printed commercial advertisement may include a QR code, wherein the user device may scan the QR code to retrieve the target discovery information from the advertisement. In another example, the user device may include a visual recognition, wherein the recognized image may include a pattern which can be associated with the target discovery information. In another example, an NFC radio, wherein the user device is provided with the target discovery information, upon tapping the user device against the target device or being the proximity of the target device.

Optionally, the target discovery information further comprises target device metadata. The target device metadata refers to data which provides information about one or more features of the target device. In an example, a target device may be a camera. In such an example, the metadata related to the camera may be the features of the camera. Optionally, the target device metadata comprises manufacturer assigned details associated with the target device. The manufacturer assigned details comprise details of the target device such as name of the target device, symbolic representation of the target device, pictorial representation of the target device, name of the manufacturer of the target device and the like. In an example, a target device such as a lighting bulb has target device metadata such as, name of the target device as: bulb001, a symbolic representation of the target device having a bulb emitting light, a manufacture name such as ABC enterprise.

The connection request generated at the user device and received at the target device is authenticated using the cryptographic algorithm. The cryptographic algorithm is an encryption and decryption algorithm or a sign and signature validation algorithm that involves usage of cryptographic keys for establishing secure and authenticated communication between the user device and the target device. In an example, a cryptographic algorithm may be the ability to validate a signature using a public key, without having access to the corresponding private key, which was used to produce the signature. The validation of the signature confirms that the public key matches the secret private key of the signature author.

Optionally, authentication of the user device by target device is configured to involve the use of a challenge-response scheme. Throughout the present disclosure the challenge-response scheme refers to a set of protocols used by the target device to authenticate a crypto-identity, which is needed when the user device establishes a connection with the target device. In an example, the target device using the challenge-response scheme may be the authenticating authority and the user device may be the requesting entity. In such example, the target device is configured to present the user device with a random challenge value, such as "SL$5FE7", to which the user device has to respond with a computed response value, such as "WO&RT3Y", which has been produced out of the challenge value using the user device private key. The mechanism is commonly referred to in the art as a challenge-response scheme. In such example, the response value provided by the user device, namely "WO&RT3Y" can be verified by the target device using the user device public key, that the response value has been produced based on the challenge value "SL$5FE7" provided by the target device, using the user device secret private key. In such example, the target device may include a cryptographic algorithm to verify using the user device public key that the WO&RT3Y corresponds to SL$5FE7 and that the user private key has been used for authoring the response value.

Optionally, the cryptographic algorithm is an asymmetric cryptography, involving the use of public key for verification of a digital signature over data, wherein the digital signature has been authored by the corresponding private key. In an example, the asymmetric cryptographic algorithm generates the cryptographic keys for encrypting and decrypting data transferred during communication between the target device and the user device. In such example, an encrypting party (such as the user device) uses the receiving party's public key (such as the public key of the target device), and decryption of the result requires the corresponding private key to be used. Therefore, in such example, the connection request generated at the user device can be authenticated by the target device using the digital signature included in the connection request.

Moreover, upon receiving the connection from the user device the target device is configured to receive the user device contact information in the executing environment of the target device. The executing environment of the target device refers to the condition in which the target device is operating. The executing environment of the target device is the area within which the target discovery information is received by the user device for establishing the communication with the target device. In an example, the target device may be a printer that includes a Bluetooth® device to share the target discovery information to the user device, such as smart phone. In such example, the distance within with the smart phone can communicate with the printer is the executing environment of the printer.

The user device contact information relates to a data that allows the target device to identify and communicate with the user device. In an example, the user device contact information may name the communication protocols for communicating with the user device. Furthermore, the user device contact information may comprise a cryptographic key, such as a user device public key. In another example, the user device contact information may include cryptographically signed attestations from any number of parties.

Optionally, the user device contact information further comprises user device metadata. The user device metadata refers to data which provides information about one or more features of the user device. In an example, a user device may be a cell phone. In such an example, the metadata related to the cell phone may be the name of the manufacturer and device model. Optionally, the user device metadata comprises user assigned details associated with the user device. The user assigned details comprise details of the user device such as a description of where the user device is installed, a symbolic representation of the user device, a pictorial representation of the user device and the like. In an example, a user device such a router has a user device metadata such as, name of the user device as: router001, a symbolic representation of the user device having a manufacturer name such as XYZ enterprise.

Optionally, the user device metadata comprises verifiable claims by third parties. In an example, the third party may be a corporate network controller, which authenticates staff users when they log on the network. In such an example, the user device may be used by a staff user, and the user device can receive a digitally signed certificate for a crypto-identity that has been generated by code received from a printer, which the user device has discovered. This allows the user to effortlessly access and authenticate with the printer, while the printer can confirm that the user is authorized to use the printing service according to verifiable claims included in the digitally signed certificate.

Moreover, the user device is configured to transmit the user device contact information to be received by the target device. The transmission refers to securely communicating the user device contact information to be received by the target device via a data network, that can be encrypted. Optionally, securely communicating the user device contact information comprises encrypting the user device contact information in a manner that the user device contact information can be decrypted by the target device. Optionally, the user device contact information may be cryptographically signed, so that the target device may verify that the user device contact information has not been tampered with.

Furthermore, the target device is configured to determine whether admin rights have been set in the target device. The admin rights refer to the rights to manage access for others to the target device, such as an electronic door lock, an autonomous vehicle and a smart lighting system. Furthermore, where the target device does not have any admin, the port where the operational service can be reached, such as a https server which typically run on port 443, is not yet available and can thereby implicitly mean that the admin has not been set on the target device.

Optionally, for determining whether admin rights have been set in the target device, an admin communication channel and a user communication channel are used for connecting the user device to the target device. The admin communication channel refers to a communication arrangement wherein user device is enabled to manage and control access for others to the target device. The user communication channel refers to a communication arrangement wherein user device is enabled to control the controllable functionalities and selectively access the functionalities of the target device. It will be appreciated that the communication arrangement for the user communication channel is protocol of data communication between the user device and the target device. Moreover, if the user communication channel is not available, then the admin has not been set on the target device. For example, a target device may be a router and a user device may be a smart phone. In such example, the smartphone, upon requesting a connection to the router may determine that the user communication channel is not available. In such instance, the smartphone may be configured to interpret that the admin has not been set on the router. Furthermore, if the user communication channel is available, then the admin has been set on the target device. In the above example, the smartphone, upon requesting a connection to the router may determine that the user communication channel is available. In such instance, the smartphone may be configured to interpret that the admin has been set on the router.

Moreover, if admin rights have not been set in the target device then setting in the target device the user device public key to have admin rights. The target device includes a collection of programs or routines that are configured to set the user device to have the admin rights of the target device. In other words, the user device is enabled to to manage and control all the controllable functionalities of the target device, upon being identified and authenticated using the user device public key. Specifically, either the target device is been instructed to set the public key of a remote crypto-identity as admin for a first-time access; or the user device specifically communicates with the target device to request for the admin rights. In an example, a user device, namely a smart phone having admin rights of a target device, namely a smart television may control a visual setting of the smart television, a numeric number assigned to one or more channels displayed on the smart television, a language used on one or more channels displayed on the smart television and the like. In such an example, the user device may be able to control the pairing of other devices such as a tablet computer with the smart television.

Furthermore, if the admin rights are set in the target device, then decline access for user device, request access from an admin, or assign a role according to target device application and trustworthiness of user device. Specifically, upon receiving the request for admin rights from the user device, one or more computer program or routine comprised in the target device is configured to decline the access for user device. In an example, the target device may be an electronic door lock, wherein the admin rights of the electronic door lock are assigned to a personal computer. In such an example, if the user device such as smart phone is requesting for the admin rights of the electronic door lock, one or more computer program or routine comprised in the electronic door lock is configured to reject the admin rights of the electronic door lock to the smart phone. In another example the target device may include an electronic wallet, wherein the electronic wallet is configured to grant access to the user device upon receiving a payment from user device.

Furthermore, in the event wherein the target device rejects the request of the admin rights, the address of the admin of the target device is provided to the user device, or the target device is relaying the request(s). It will be appreciated that the admin is a computing device that is a communication capable device that can communicate with the target device, the source and the user device via the data network. For example, the address of the admin may comprise an IP address, a MAC address, a Uniform Resource Locator, and the like.

The user device uses the address provided by the target device to communicate with the admin, or communicates via the relaying target device with the admin. Furthermore, the user device communicates with the admin via the data network. Thereafter, the admin assigns the role to the user device based on the target device application. The target device application refers to the actions or activities that can be performed by the target device. For example, if the target device is air conditioner. In such an example, the application may be controlling the desired temperature of the air. Furthermore, the role assigned by the admin to the user devices comprise admin or non-admin role wherein the user devices have partial access to the target device such that the user devices can partially manage the controlling and working of the software and hardware components and thereby the user devices with non-admin role have limited access to the target device, for instance limitations on granting access permissions.

Furthermore, the trustworthiness of user devices is evaluated by the target device by using the user device contact information. If the target device is unable to evaluate the trustworthiness based on the available information, it will prompt the target device admin for a decision. In an example, a user device which has previously connected to a target device made by the same manufacturer as the manufacturer of a target device having the admin, the user device is considered to be trustworthy. More optionally, the trustworthiness of user devices is evaluated by the target device by using the user device contact information which comprises a physical location of the user device. In an example, a user device in lower vicinity of the target device is considered to be trustworthy compared to the user device in higher vicinity of the target device.

The system comprises the user device, the user device being configured to use the resource identifier for obtaining the executable code from the source. The resource identifier refers to any electronic object that enables the user device to locate and access the source via the data network. In an example, the resource identifier may be a uniform resource identifier. In such example, the uniform resource identifier may be a string of characters used to locate and access the source over the data network. Furthermore, the uniform resource identifier enables accessing a web location of the source for acquiring the executable code from the source. Furthermore, the resource identifier can be a uniform resource locator, a uniform resource name, or a hyperlink.

Optionally, the user device comprises a user agent module for using the resource identifier to obtain and execute the executable code. The user agent module refers to a computer program or a routine that is configured to accept the resource identifier as an input and access the source to fetch the executable code. Furthermore, the user agent module comprises one or more routines, data structures, object classes and/or protocols that support the interaction of the user device and the source via the data network. It will be appreciated that the user agent module invokes system-level code or calls to other software residing on the user device or other location communicatively coupled with the user device to perform certain functions, such as setting up a communication session between the user device and the source. In an example, a user agent module is a software application that operates on any form of computing device, such as the user device, and that is capable of accessing static data or resource files stored in the user device, such as user-viewable hypertext documents. In such an example, the user agent module may be a web browser that, in operation, uses the resource identifier to navigate via the data network to access the source and obtain the executable code therein. Furthermore, examples of commercially available web browsers may be Microsoft Internet Explorer®, Google Chrome®, Mozilla Firefox®, and the Opera Browser®.

Optionally, the user using the user device inputs the resource identifier in the user device. For example, the user using the user device may use one or more tools to input the resource identifier in the user agent module. In such an example, the one or more tools may comprise a physical or a virtual keyword, a mouse or a keypad, a camera comprised in the user device that is configured to recognize printed characters and the likes. Alternatively, the user device is configured to automatically acquire resource identifier from a discovery source. For example, the discovery source may be a near field communication (NFC) device that is configured to store and share the resource identifier to the user device when the user device is in the vicinity of the near field communication (NFC) device. It will be appreciated that, an automatic communication module, such as a near field communication (NFC) module is embedded in the user device for automatically acquiring the resource identifier from the discovery source.

Optionally, the source is configured to provide the user device with the executable code based on the configuration of the user device. In an example, executable codes required for different user devices such as cellular phone, personal digital assistant (PDAs), laptop computer, personal computer may be different. Optionally, the resource identifier used by the user comprises information related to the specifications of the user device. For example, the resource identifier may be a uniform resource identifier that comprises a query string describing the specification of the user device. In such an example, the source may be configured to provide the user device with an executable code that is appropriate for the user device. In such an example, the executable code appropriate for the user device may be configured to be executed by the processor so that it results in a video signal that it optimum for the user device's display, such as 1024 dots wide and 768 dots high.

Optionally, the executable code is served by the source to a user device which executes the received executable code and accesses the crypto-identity from a bearer device that is operatively coupled with the user device. Specifically, the bearer device refers to an electronic device that is configured to be operatively coupled to any computing device, namely the user device to enable the user device to communicate over the data network with the source. Example of bearer device may comprise subscriber identification module (SIM) card, smart card, hardware wallet, Wi-Fi dongle, and the like. Furthermore, the user device comprises a holding slot or a communicating module for operatively coupling with the bearer device. Additionally, the bearer device may provide a cryptographic feature for proving that it possesses the private key that corresponds to the readable public key, to the executable code, after the user device uses the resource identifier in the user agent module to fetch the executable code.

The user device is configured to execute the executable code in the user device for performing at least one of: creating the user device crypto-identity; and assigning the user device crypto-identity. The executable code may include a cryptographic signature. The execution of the executable code may include a verification of the cryptographic signature, to ensure that the executable has not been tampered with. The execution of the executable code in the user device may comprise compiling the executable code, wherein the executable code is checked for errors. Thereafter, the executable code is accessed by a program, namely a system software of the user device for loading the executable code to a hardware component, such as a cache memory of the user device for dynamic linking of the executable code. Furthermore, the system software of the user device uses another component of the user device, namely an interpreter to convert the executable code to a machine level language for performing the instruction mentioned in the executable code.

Optionally, the executable code obtained from the source is executed by a processing unit, such as a processor comprised in the user device. In an example, the processor may be communicatively coupled with a plurality of terminals (such as input and/or output terminals) connecting to the one or more components of the user device, such as the memory, display, the network interface card, and the like. In such an example, executing the executable code at the processor may control and regularize the flow of electricity to the plurality of terminals to perform the instructions comprised in the executable code, such as requesting a connection with the target device.

The execution of the executable code in the user device invokes the process of creating or assigning the user device crypto-identity. Furthermore, the process of creating the user device crypto-identity comprises using an algorithm that generates a unique keypair from a string of binary digits. In an example, the unique string may be derived by measuring essentially random environmental factors surrounding the device, such as temperature and rate of change of temperature over a period of time. It will be appreciated that, the user device crypto-identity is readily generated when it is time to authenticate with the target device.

Furthermore, assigning the user device crypto-identity refers to providing access to the crypto-identity's cryptographic features such as sign, which can be used for verifying the possession of the private key which corresponds to the readable public key. In an example, a memory unit configured to store the assigned user device crypto-identity may comprise an internal or external chip which does not provide any way of reading out the private key, but still provides cryptographic features for using it.

The executable code configures the user device for connecting the user device with the target device using a target device contact information. The target device contact information relates to a data that allows the user device to identify and communicate with the target device. In an example, the target device contact information may name the communication protocols for communicating with the target device. Furthermore, the target device contact information comprises a cryptographic key. Optionally, the target device contact information further comprises a target device public key. It will be appreciated that the target device public key is the public key of the asymmetric cryptographic keypair generated during the initializing the functioning of the target device.

Moreover, upon receiving the target device contact information the executable code configures at least one component, such as network interface card of the user device to transmit request for connecting with the target device. The user device connects with the user device with the target device via the data network. Furthermore, the data network may comprise, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Additionally, the network comprises communication that can be carried out via any number of known protocols, comprising, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed.

The executable code configures the user device for transmitting the user device contact information to be received by the target device, wherein the user device contact information comprises the user device public key. The execution of the executable code enables the user device to transmission of the user device contact information. The user device contact information is provided to the target device for identification and authentication of the user device during the connection of the user device with the target device. The user device contact information comprises the user device public key. The user device public key is the public key of an asymmetric cryptographic keypair consisting of a public key and a corresponding private key. Moreover, the key generation module in the use device can generate the pair of cryptographic keys using a seed number.

Optionally, the user device crypto-identity is configured to anchor trust to an external service by using authentication credentials for that service for logging in, and the external service is configured to issue a verifiable attestation to the user device including the user device public key or hash of user device public key. Optionally, the authentication credentials may be a user attribute such as position and division in an organisation, digitally signed by the organisation that can be used for logging in to the external service. In such instance, the user device is configured to anchor trust to the external service. Optionally, to anchor trust in the external service the user device attains access to the external service by using the password or the digital signature. The verifiable attestation issued by the external service is used by the target device to authenticate the user device, based on attestation from the certificate signatory trusted by the target device. In an example, user device public key may be "BS@G#DS&TD6" and the hash value of the user device public kay may be "12c914dec68". In such example, the verifiable attestation issued by the external service may include either "BS@G#DS&TD6" or "12c914dec68", and signature produced by external service for authentication.

Optionally, the verifiable attestation contains metadata provided by the external service, and the attestation is digitally signed by the external service. The metadata provided by the external service include the details of the external service. Examples of details may include the name of the external service, time of providing the service, cost of providing the service and the like. The digitally signed attestation includes the attestation including the digital signature data of the external service, such digital signature may be, for example, a cryptographic fingerprint computed as a function of a message.

In an exemplary implementation, a target device such as an Internet Protocol (IP) camera is used for a first time in an executing environment such as a surveillance environment. Furthermore, the IP camera comprises a target device crypto-identity, ethernet connectivity and uses a Dynamic Host Configuration Protocol (DHCP) for connecting to a user device such as a mobile phone. A user of the mobile phone discovers the IP camera by scanning a target discovery information such as a Quick Response (QR) code of the IP camera. The QR code redirects the mobile phone to a hyperlink which allows the mobile phone to receive an executable code. The mobile phone executes the executable code to create a user device crypto-identity. The mobile phone sends the user device crypto-identity to the IP camera and thereby establishes a connection with the mobile phone. The mobile phone determines whether admin rights have been set in the IP camera. In such a case, as the IP camera is used for the first time, the mobile phone is assigned the (so far exclusive) admin rights of the IP camera enabling the user to control working of the IP camera.

In another exemplary implementation, a scenario comprises a target device such as a parking lot gate having a target device crypto-identity, and a user device such as a vehicle which is to be parked in a parking lot. Furthermore, the vehicle comprises an external bearer device such as a smart card used on a card reader inside the vehicle. The vehicle when in proximity of the parking lot is operable to identify the parking lot gate. Furthermore, the vehicle receives an executable code from the parking lot gate. The executable code is executed by the vehicle, and the executable code assigns the smart card crypto-identity as the user device crypto-identity of the vehicle. The vehicle establishes a connection with the parking lot gate and determines whether admin rights have been set in the target device by using data communication via a port which would not be available unless the gate would earlier have been commissioned by an admin. In such a case, if the parking lot gate admin rights have been set, the existing admin rejects the admin request for the vehicle, and instead provide default operational access which can be used for normal parking. Furthermore, if the parking lot gate admin rights have not yet been claimed by anyone, the vehicle, e.g. the vehicle of the parking lot owner, is assigned the admin rights of the parking lot gate and thereby the crypto-identity of the bearer device of the vehicle can manage further access requests. The parking lot owner can later move his bearer device comprising his crypto-identity to another environment with more purposeful user interface.

In yet another exemplary implementation, a target device such as temperature sensor in an executing environment such as a boiler environment is used to continuously measure the temperature of a boiler. Furthermore, the temperature sensor is connected to an Internet of Things (IoT) module. The IoT module determines whether admin rights have been assigned to the IoT module, if the admin rights are not assigned then the admin rights are assigned to the personal computer. The Internet of Things (IoT) module receives reading of the temperature from the temperature sensor and transmits the reading to the personal computer. Therefore, a user can remotely connect to the temperature sensor via the Internet of Things (IoT) module through the personal computer.

The present disclosure also relates to the method as described above. Various embodiments and variants disclosed above apply mutatis mutandis to the method.

Optionally, in the method, authentication of the user device by target device is configured to involve the use of a challenge-response scheme. Optionally, in the method, the target device contact information comprises a target device public key. Optionally, in the method, the executable code is served by the source to a user device which executes the received executable code and accesses the crypto-identity's cryptographic features from a bearer device which is operatively coupled to the user device.

Optionally, in the method, the target discovery information further comprises target device metadata.

Optionally, in the method, the user device contact information further comprises user device metadata.

Optionally, in the method, the user device comprises a user agent module for using the resource identifier to obtain and execute the executable code.

DETAILED DESCRIPTION OF THE DRAWINGS

Referring to FIG. 1, there is shown a block diagram of a system 100 for assigning access rights for a user device 102 using public key relations, in accordance with an embodiment of the present disclosure. As shown, the system comprises the user device 102, a target device 104, and a source 106. The target device 104 receives a connection from the user device 102 having an executable code for connecting and authenticating with a cryptographic algorithm. The source 106 is configured to serve the executable code to the user device 102.

Figure 2:
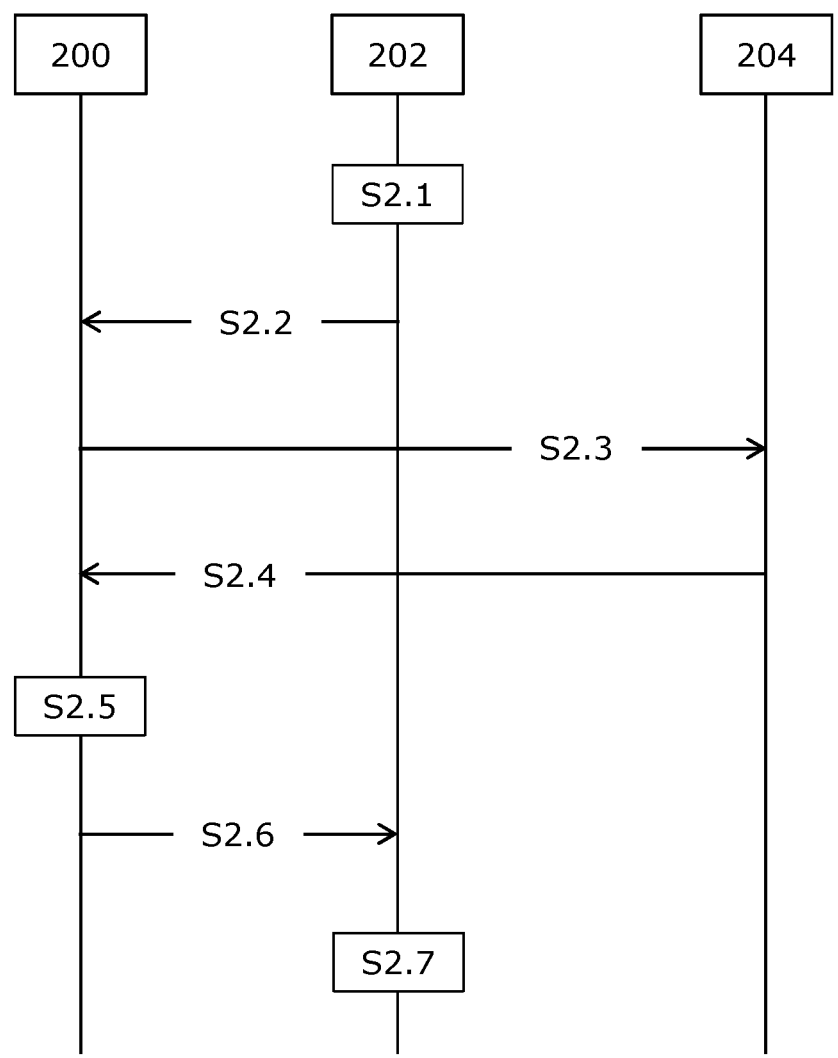
FIG. 2 is an exemplary sequence diagram of an exemplary implementation of the system of FIG. 1, in accordance with an embodiment of the present disclosure.

Referring to FIG. 2, there is shown an exemplary sequence diagram of an exemplary implementation of the system 100 of FIG. 1, in accordance with an embodiment of the present disclosure. As shown, the exemplary sequence diagram comprises a user device 200, a target device 202, and a source 204. At step S2.1, the target device 202 performs at least one of: creating a target device crypto-identity; and assigning a target device crypto-identity. At step S2.2, target discovery information is provided to the user device 200 by the target device 202, wherein the target discovery information comprises target device public key. At step S2.3, the user device 200 uses a resource identifier for obtaining the executable code from the source 204. At step S2.4, the user device 200 uses the resource identifier for retrieving the executable code to the user device 200. At step S2.5, the executable code in the user device 200 is used for performing at least one of: creating a user device crypto-identity; and assigning a user device crypto-identity. At step S2.6, the executable code in the user device 200 is used for connecting the user device 200 with the target device 202 using a target device contact information and transmitting the user device contact information to be received by the target device 202. At step S2.7, the target device 202 determines whether admin rights have been set in the target device 202. Furthermore, based on the determination if the admin rights have not been set, then the target device 202 sets the user device 200 to have admin rights. Moreover, based on the determination, if the admin rights have been set, then the target device 202 either declines access for user device 200, forwards the access request to an admin who can decline or accept the request, or assigns a role according to target device application and trustworthiness of user device 200.

Figure 3:
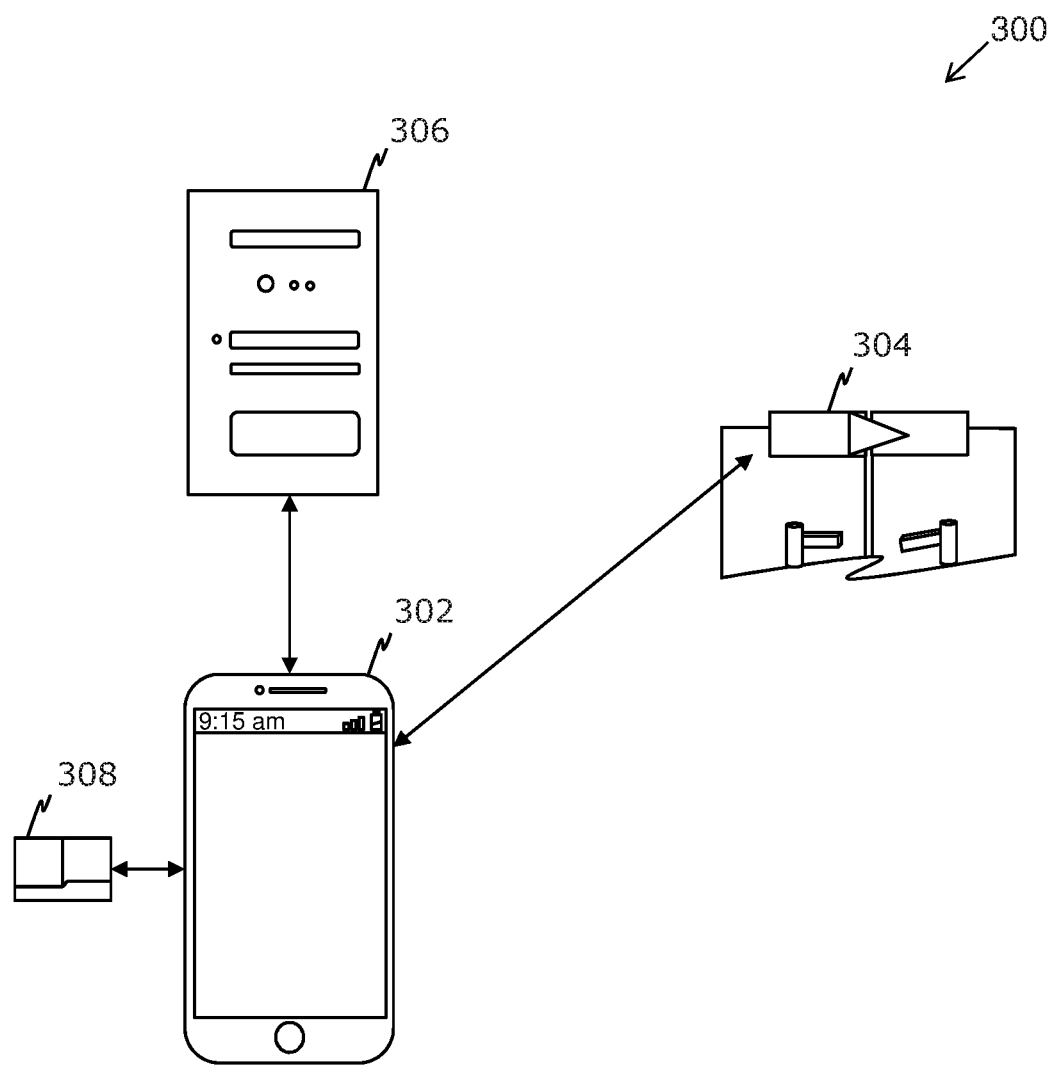
FIG. 3 is a schematic illustration of an exemplary implementation of the system of FIG. 1, in accordance with an embodiment of the present disclosure.

Referring to FIG. 3, there is shown an exemplary implementation of the system 300 of FIG. 1, in accordance with an embodiment of the present disclosure. As shown, the system 300 comprises a user device (depicted as a cellular phone) 302, a target device (depicted as a door lock) 304, a source 306, and a bearer device 308. The bearer device 308 is operatively coupled with the cellular phone 302. The door lock 304 receives a connection from the cellular phone 302 having an executable code for connecting and authenticating with a cryptographic algorithm. The source 306 is configured to serve the executable code to the cellular phone 302. The cellular phone 302 is operable to execute the executable code which interfaces and accesses the crypto-identity found in the bearer device 308.

Modifications to embodiments of the present disclosure described in the foregoing are possible without departing from the scope of the present disclosure as defined by the accompanying claims. Expressions such as "comprising", "comprising", "incorporating", "have", "is" used to describe and claim the present disclosure are intended to be construed in a non-exclusive manner, namely allowing for items, components or elements not explicitly described also to be present. Expressions such as "may" and "can" are used to indicate optional features, unless indicated otherwise in the foregoing. Reference to the singular is also to be construed to relate to the plural.

Figure 4:
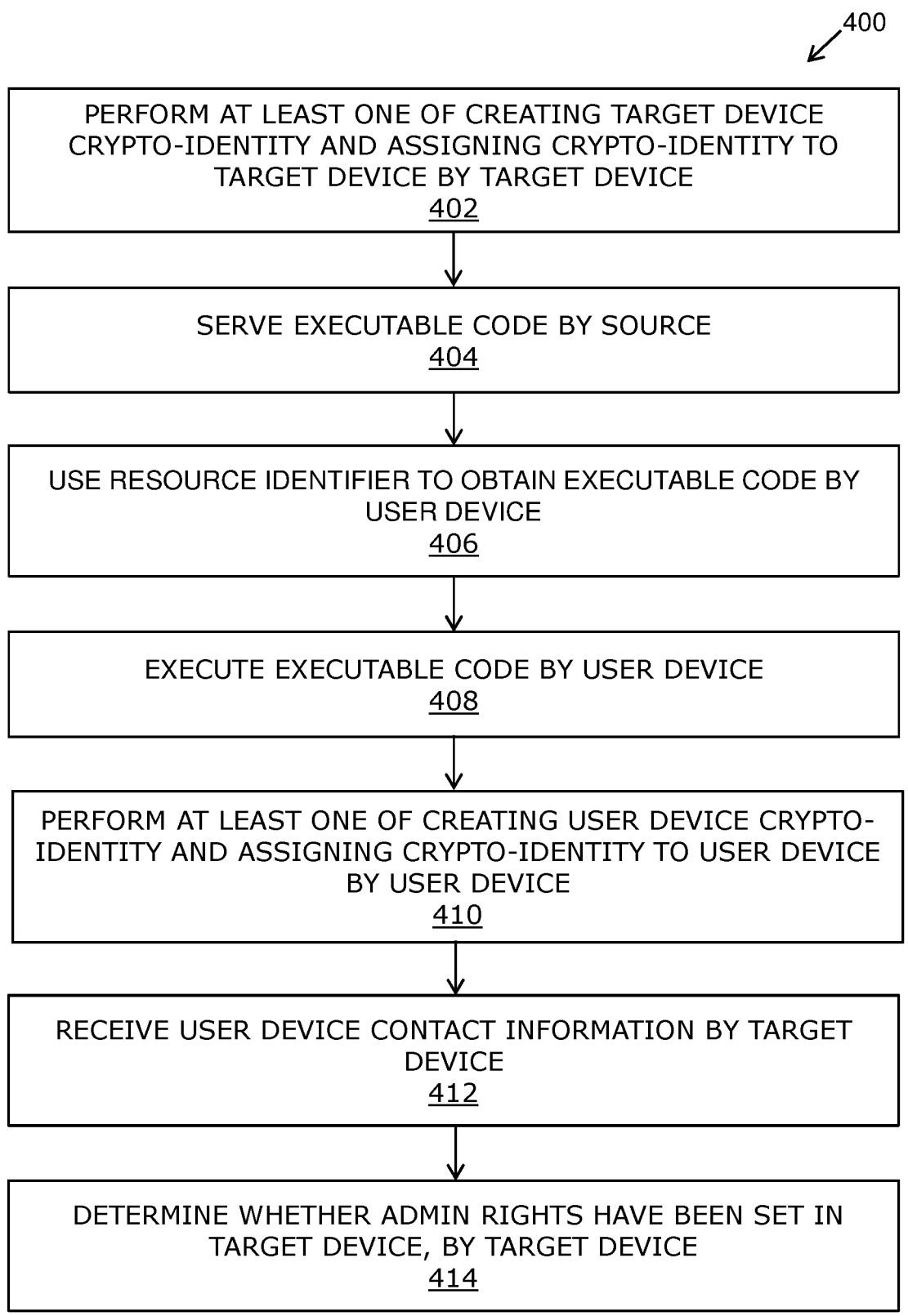
FIG. 4 is an illustration of steps of a method for assigning access rights for public key relations on a target device, in accordance with an embodiment of the present disclosure.

Referring to FIG. 4, there is shown a method for assigning access rights to a user device. At a step 402, a target device is configured to perform at least one of creating a target device crypto-identity, which is an asymmetric cryptographic keypair consisting of a public key and a corresponding private key, and assigning target device crypto-identity. At a step 404, a source is configured to serve the executable code to the user device. Moreover, at step 406 the user device obtains the executable code from the source, using the discovery information. At a step 408, the user device is configured to execute the executable code in the user device. At step 410 the executable code is performing at least one of creating a user device crypto-identity, and assigning a user device crypto-identity, and the executable code is also configured for connecting the user device with the target device using a target device contact information and transmitting the user device contact information to be received by the target device, wherein the user device contact information comprises the user device public key. Furthermore, upon receiving a connection from the user device having an executable code for connecting and authenticating with a cryptographic algorithm, at a step 412, the target device is configured to receive a user device contact information in an executing environment of the target device. Moreover, at a step 416, the target device is configured to determine whether admin rights have been set in the target device. If the admin rights have not been set in the target device, then setting in the target device the user device public key to have admin rights. Furthermore, if the admin rights have been set in the target device, then either access for the user device is declined and access is requested from an admin, or a role defining level of access for the user device contact information on the target device according to target device application and trustworthiness of the user device is assigned.

The invention claimed is:

1. A system for assigning access rights to a user device, the system comprising:
a source configured to serve an executable code to the user device, the executable code configured to enable the user device to connect and authenticate with a cryptographic algorithm; and
a target device, wherein the target device is configured to:
create a target device crypto-identity, the target device crypto-identity comprising an asymmetric cryptographic keypair consisting of a target device public key and a corresponding private key;
assign itself the target device crypto-identity;
and upon receiving a connection from the user device having the executable code, the target device is configured to:
receive a user device contact information in an executing environment of the target device;
determine whether admin rights have been set in the target device; and
if not, then setting in the target device the user device, to have admin rights;
if yes, then either:
decline access for the user device,
request access from an admin, or
assign a role defining a level of access for the user device contact information on the target device according to a target device application and a trustworthiness of the user device,
and
wherein the user device is configured to use a resource identifier for:
obtaining the executable code from the source;
executing the executable code in the user device for performing at least one of:
creating a user device crypto-identity; and
assigning a user device crypto-identity;
connecting the user device with the target device using a target device contact information; and
transmitting the user device contact information to be received by the target device;
wherein the user device contact information comprises a user device public key.

2. The system of claim 1, further comprising an admin communication channel and a user communication channel for connecting the user device to the target device to determine whether admin rights have been set in the target device, wherein
if the user communication channel is not set up, then the admin has not been set on the target device, and
if the user communication channel is set up, then the admin has been set on the target device.

3. The system of claim 1, where an authentication of the user device by the target device uses a challenge-response scheme.

4. The system of claim 3, where a validation of an authentication response requires that a signature made by the corresponding private key using an asymmetric signature algorithm match the user device public key.

5. The system of claim 1, wherein a target discovery information to the user device is provided by at least one of a keyboard, a network interface, a radio receiver, a camera, the target device, an online discovery service, a local subnet discovery protocol, a received file, a Bluetooth device, an electronic wallet, the source, a barcode, a QR code, a visual recognition and an NFC tag.

6. The system of claim 1, wherein the target device contact information further comprises a target device public key.

7. The system of claim 1, wherein the user device is further configured to execute the executable code to access cryptographic features of a bearer device which is operatively coupled to the user device.

8. The system of claim 5, wherein the target discovery information further comprises target device metadata.

9. The system of claim 1, wherein the user device contact information further comprises user device metadata.

10. The system of claim 9, wherein the user device metadata comprises verifiable claims by third parties.

11. The system of claim 1, wherein the user device comprises a user agent module for using the resource identifier to obtain and execute the executable code.

12. The system of claim 1, wherein the user device crypto-identity is configured to anchor trust to an external service by using authentication credentials for the external service for logging in, and the external service is configured to issue a verifiable attestation to the user device including the user device public key or a hash of the user device public key.

13. The system of claim 12, wherein the verifiable attestation contains metadata provided by the external service, and the attestation is digitally signed by the external service.

14. A method for assigning access rights to a user device, the method being implemented using a system comprising:
   a source configured to serve an executable code to the user device, the executable code configured to enable the user device to connect and authenticate with a cryptographic algorithm; and
   a target device, wherein the method comprises the target device:
      creating a target device crypto-identity, the target device crypto-identity comprising an asymmetric cryptographic keypair consisting of a target device public key and a corresponding private key; and
      assigning itself the target device crypto-identity;
      and upon receiving a connection from the user device having the executable code, the target device is configured to:
      receive a user device contact information in an executing environment of the target device;
   determine whether admin rights have been set in the target device; and
      if not, then set in the target device the user device to have admin rights;
   if yes, then either:
      decline access for the user device,
      request access from an admin, or
      assign a role defining a level of access for the user device contact information on the target device according to a target device application and a trustworthiness of the user device,
   and
   wherein method further comprises the user device using a resource identifier for:
      obtaining the executable code from the source;
      executing the executable code in the user device for:
      creating a user device crypto-identity;
      assigning the user device crypto-identity; and
      connecting the user device with the target device using a target device contact information; and
      transmitting the user device contact information to be received by the target device; wherein the user device contact information comprises a user device public key.

15. The method of claim 14, wherein an authentication of the user device by the target device is configured to involve use of a challenge-response scheme.

16. The method of claim 14, wherein the target device contact information comprises the target device public key.

17. The method of claim 14, wherein the method further comprises the user device executing the executable code to access cryptographic features of a bearer device which is operatively coupled to the user device.

18. The method of claim 14, wherein a target discovery information comprises target device metadata.

19. The method of claim 14, wherein the user device contact information further comprises user device metadata.

20. The method of claim 14, wherein the user device comprises a user agent module for using the resource identifier to obtain and execute the executable code.

* * * * *